United States Patent

Liberman

[15] 3,651,474

[45] Mar. 21, 1972

[54] SYNCHRONIZATION SYSTEM WHICH USES THE CARRIER AND BIT TIMING OF AN ADJACENT TERMINAL

[72] Inventor: Richard A. Liberman, Stratford, Conn.

[73] Assignee: International Business Machines Corporation, Armonk, N.Y.

[22] Filed: Mar. 31, 1970

[21] Appl. No.: 24,311

[52] U.S. Cl. ....................340/172.5

[51] Int. Cl. ....................G06f 3/04, H04l 7/04

[58] Field of Search....................340/172.5; 328/63.72

[56] References Cited

UNITED STATES PATENTS

| | | | |
|---|---|---|---|
| 3,208,050 | 9/1965 | Bird et al. | 340/172.5 |
| 3,363,183 | 1/1968 | Bowling et al. | 328/63 |
| 3,418,637 | 12/1968 | Humphrey | 340/172.5 |
| 3,435,424 | 3/1969 | Shira et al. | 340/172.5 |
| 3,528,060 | 9/1970 | Streif | 340/172.5 |

*Primary Examiner*—Paul J. Henon
*Assistant Examiner*—Harvey E. Springborn
*Attorney*—Hanifin and Jancin and George E. Clark

[57] ABSTRACT

A data communications system including apparatus at each remote location for detecting the carrier phase and bit timing of transmitted data from an adjacent, more remote terminal, to maintain synchronization for subsequent data transmissions from each remote terminal without the need for resynchronizing.

6 Claims, 2 Drawing Figures

INVENTOR
RICHARD A. LIBERMAN

BY George E. Clark
AGENT

A SYNCHRONIZATION SYSTEM WHICH USES THE CARRIER AND BIT TIMING OF AN ADJACENT TERMINAL

BACKGROUND OF THE INVENTION

The instant disclosure relates to data communications systems and more particularly to apparatus for maintaining synchronization between a central control device and a number of remote terminals in a data communications system.

In the prior art, synchronization between a central control location and a number of remote locations was initiated by a synchronization or polling cycle prior to transmission of data. Since there was a synchronization dropout at the end of each data transmission, it was necessary to resynchronize with each subsequent data request.

Since the normal synchronization polling cycle requires much more time when the average data transmission, the resynchronization following each data transmission was very inefficient and time consuming. An example of a normal synchronization polling cycle is shown in FIG. 9 and described beginning at line 55 of column 34 of commonly assigned U.S. Pat. No. 3,244,804. This patent shows a normal carrier synchronization time requirement of 8.5 milliseconds, a bit synchronization time requirement of six bit times and a character synchronization time requirement of six bit times before data transmission can begin.

It is, therefore, an object of the present invention to maintain synchronization in a data communications system without the need for resynchronizing after each data transmission.

It is a further object of the present invention to monitor the synchronization sequence transmitted by a remote terminal transmitter and detect the carrier phase and bit timing to maintain synchronization of further data transmissions by the adjacent, less remote, terminal transmitter.

SUMMARY

In accordance with the present invention, a data communications system includes a central control station including transmitting and receiving devices, a number of remote terminals each of which includes a transmitting device and a receiving device and a monitor device for monitoring the carrier phase a bit timing of the synchronization sequence to maintain the data communications system in synchronization, and a first remote terminal which includes only a single transmitting and a single receiving device since there is no further outbound remote terminal whose transmissions must be monitored at the first remote terminal. The monitor device located at each remote terminal except the first remote terminal which monitors transmissions from the central control station, maintains a running check on the carrier phase and bit timing of the data transmitted from the next most remote terminal in the data communications system to allow further data transmission from other remote terminals without the need of transmitting a new synchronization polling sequence.

These, and other objects, features and advantages of the present invention will be apparent from the following, more particular description of a preferred embodiment thereof as illustrated in the accompanying drawings.

DETAILED DESCRIPTION OF THE INVENTION

Figure 1:
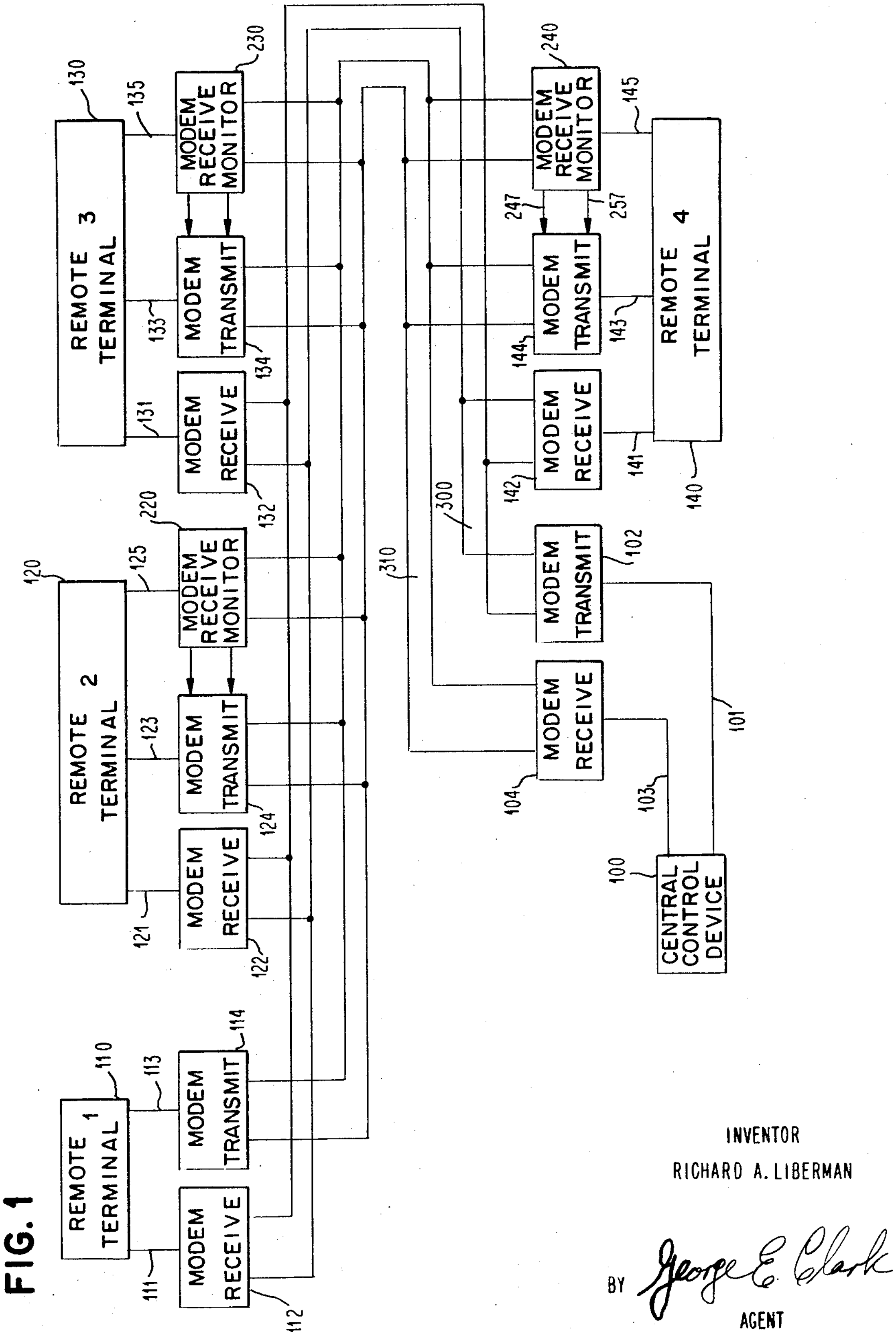
FIG. 1 is a block diagram of a data communications system embodying the instant invention.

Referring now to FIG. 1, a data communications system is shown in which a central control device 100 is connected to transmitting means 102 by lines 101 and is connected to receiving means 104 by lines 103. Central control device 100 with transmitting means 102 and receiving means 104 form the central station of the data communications system.

DATA OUT line 300 and DATA IN line 310 form the data communications network. The output of transmitting means 102 is connected to the respective inputs of the receiving means at each remote terminal by DATA OUT lines 300. Thus, DATA OUT lines 300 connect transmitting means 102 to remote receiving means 112, 122, 132, and 142. Remote receiving means 112, 122, 132, and 142 are individually connected to individual accompanying remote terminals 110, 120, 130, and 140 by lines 111, 121, 131, 141 respectively.

Although the preferred embodiment shown contains only four remote terminals for simplicity in explanation, the system could be expanded to any number of remote terminals within the capability of the telephone line system as set out in the Bell System Technical Reference entitled "Transmission Specifications for Voice Grade Private Line Data Channels" Mar., 1969. This reference is available from Engineering Director-Data Communications, American Telephone and Telegraph Company, 195 Broadway, New York, N.Y. 10007.

Central receiving means 104 is connected by DATA IN lines 310 to transmitting means 114, 124, 134, and 144 at each individual accompanying remote terminal respectively. Transmitting means 114 is connected to remote terminal 110 by lines 113; transmitting means 124 is connected to remote terminal 120 by lines 123; transmitting means 134 is connected to remote terminal 130 by lines 133; and transmitting means 144 is connected to remote terminal 140 by lines 143.

Monitor devices 220, 230, and 240 have their respective inputs connected to DATA IN lines 310 and their outputs connected to individual accompanying remote terminals 120, 130, and 140, respectively, with further outputs carrying a carrier phase reference signal and a bit timing reference signal being connected to transmitting devices 124, 134, and 144 respectively.

Figure 2:
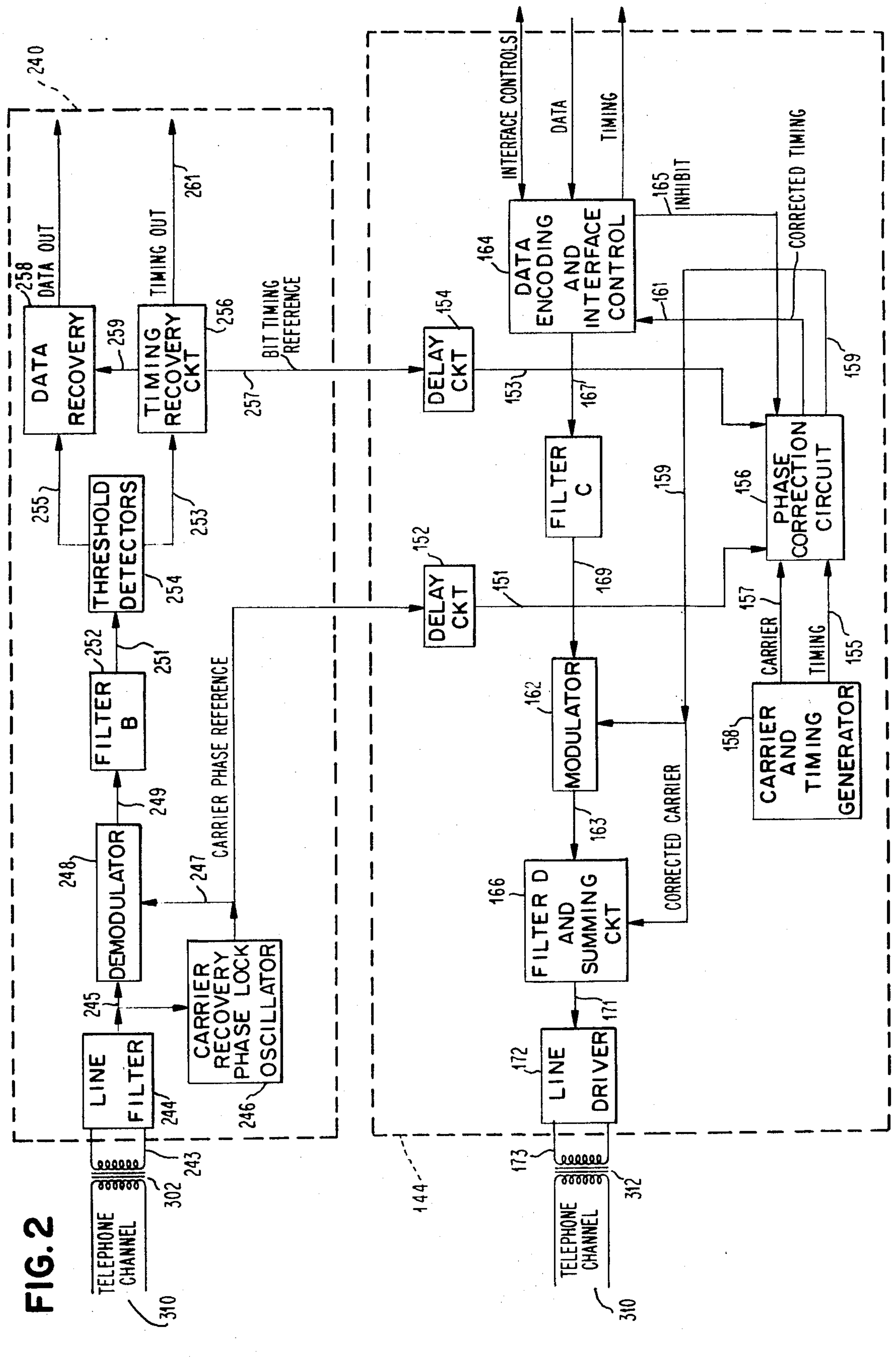
FIG. 2 is a block diagram of the monitor device and transmitting device.

Referring now to FIG. 2, a more detailed block diagram of a monitor device and the interconnections with each remote transmitting device is shown. As an example, the monitor device 240 at remote terminal 140 and transmitting device 144 and their interconnections will be explained in greater detail. More detailed circuit and timing diagrams as well as other information regarding the specific operation of modems as used in the present invention are contained in FIGS. 6 and 9 and the related description of commonly assigned U.S. Pat. No. 3,244,804. Further information is also contained in IBM Field Engineering Theory-Maintenance Manual for 4872 Modem Model I, form No. SY36-001, published in 1969, available from IBM FIELD Engineering Division, 112 E. Post Road, White Plains, New York 10601.

Monitor device 240 is connected to DATA IN communications network 310 by line transformer 302. Information on the DATA IN communications network 310 is transmitted to line filter A 244 by lines 243. Line filter A has its output connected by lines 245 to carrier recovery phase lock oscillator 246 and to demodulator 248. A second input to demodulator 248 is from carrier recovery phase lock oscillator 246 by lines 247. Lines 247 also provide the carrier phase reference signal for correcting the carrier transmitted by transmitting device 144 and maintaining synchronization. The output of demodulator 248 is connected to filter B 252 by lines 249. Filter B 252 filters the output of demodulator 248 and presents the filtered signal through threshold detectors 254 along lines 251. Threshold detectors 254 have two outputs. A first output is connected by lines 253 to timing recovery circuit 256 for separating the bit timing signals. A second output from threshold detectors 254 is connected by lines 255 to data recovery circuits 258, for recovering data for utilization in the remote terminal to generate interface control signals needed by data encoding and interface control device 164. An example of logic circuits within the remote terminal which could be used to generate the interface control signals are shown in FIG. 6 and described at column 30, lines 10-30 of U.S. Pat. No. 3,244,804. Timing recovery circuit 256 provides three outputs; a first output is connected by lines 259 to data recovery circuit 258 to provide clocking for the data signals, a second output 257 provides the bit timing reference signal which is connected to the transmitting device 144 to maintain the bit timing synchronization and a third output line 261 provides timing signal for remote terminal 140.

Carrier phase reference signal line 247 is connected to delay circuit 152 in transmitting device 144. Bit timing reference signal line 257 is connected to delay circuit 154 in transmitting device 144. Delay circuit 152 is connected to an input of phase correction circuit 156 by lines 151 and delay circuit 154 is connected to another input of phase correction circuit 156 by lines 153. Local carrier and timing generator 158 provide a second set of inputs to phase correction circuit 156 with the local carrier output being connected to phase correction circuit 156 by line 157 and local bit timing signal being connected to phase correction circuit 156 by line 155. Phase correction circuit 156 and carrier and timing generator 158 may be implemented by a circuit similar to that shown in U.S. Pat. No. 3,363,183 to Bowling, et al. Phase correction circuit 556 has another input connected to the inhibit output line 165 of data encoding and interface control 164. Inhibit line 165 gates the corrected carrier and corrected timing output signals of phase correction circuit 156 in response to interface control signals received from the remote terminal. Inhibit line 165 would typically be the output of a bistable circuit such as trigger 628 shown in FIG. 6 of U.S. Pat. No. 3,244,804.

When the signal on inhibit line 165 is inactive, phase correction circuit 156 presents a corrected carrier signal on line 159 which provides one input to modulator 162 and to filter D and summing circuit 166. Phase correction circuit 156 also provides a corrected bit timing signal to data encoding and interface control device 164 on line 161.

Data encoding and interface control device 164 receives data from the remote terminal and encodes the data according to the corrected bit timing and transmits the encoded data to filter C 168 on line 167. The output of filter C 168 is connected to the data input of modulator 162 by line 169. The output of modulator 162 is connected to the input of filter D and summing circuit 166 by line 163. The output of filter D and summing circuit 166 is connected to line driver 172 by line 171. The output of line 172 is connected to line transformer 312 by lines 173. Line transformer 312 is connected to DATA IN communications network 310 for transmitting data to the central control location.

OPERATION

Referring now to FIGS. 1 and 2, a typical data communications operation sequence will be described.

A polling sequence is transmitted by central location transmitting device 102 along DATA OUT lines 300 to the most remote terminal (terminal 1) 110 and is received by receiving device 112. If remote terminal 110 has data to transmit, the data is converted to a modulated carrier signal by modulator 162 of transmitting device 114 and transmitted by transmitting device 114 along DATA IN lines 310 to central location receiving device 104. If remote terminal 110 has no data to transmit, an idle sequence is transmitted which permits the next most remote Modem receive monitor 220 to acquire synchronization. An example of an idle sequence that could be utilized is the sequence shown in FIG. 9 and described in column 36, line 62 of U.S. Pat. No. 3,244,804 with the data characters being omitted.

As data is transmitted by transmitting device 114, each monitor device 220, 230, and 240 monitors the carrier phase and bit timing of the signals from the central control location and transmits carrier phase error and bit timing error signals to the accompanying transmitting device at each remote terminal.

However, since priority of data transmission depends upon position in the data communications system, the order of data transmission is most remote terminal 110 first, then each of the less remote terminals 120, 130, and 140 in inverse order of remoteness from the central location 100. Therefore, each monitor device 220, 230 and 240, effectively monitors only the transmission from the next most remote transmitting device. So that monitor device 220 monitors transmitting device 114 and synchronizes transmitting device 124 to the carrier and bit timing phase transmitted by transmitting device 114, monitor device 230 synchronizes transmitting device 134 to the signals transmitted by transmitting device 124 and monitor device 240 synchronizes transmitting device 144 to the signals transmitted by transmitting device 134.

Thus, monitor device 240 receives the data transmitted by transmitting device 134, filters the received signal in line filter A 244, recovers the carrier phase reference signal in carrier recovery phase lock oscillator 246 and demodulates, equalizes and filters the received signal in demodulator 248 and filter B 252. The output of filter B 252 is transmitted by threshold detectors 254 which separate data signals from timing signals. Timing and recovery circuit 256 generates a bit timing reference signal for synchronization of transmitting device 144.

Carrier phase reference signal appearing on line 247 is delayed by delay circuit 152 an amount of time such that the phase of a signal transmitted by transmitting device 144 will be in phase with the signals received by monitor device 240 although shifted by an integral number of full cycles due to inherent delays in the monitor and transmit circuitry.

Likewise, the bit timing reference signal is delayed by delay circuit 154 an amount of time such that the monitored bit timing and the transmitted bit timing are in phase although shifted by an integral number of full cycles.

To determine the delay settings of delay circuits 152 and 154, the inherent delays in line filters A, B, C, and D 244, 252, 168, and 166 must be measured so that the delay circuits 152 and 154 can be adjusted to achieve in-phase operation between the incoming data and the outgoing data.

Phase correction circuit 156 compares the carrier phase reference signal and the bit timing reference signal from delay circuits 152 and 154 respectively, with the locally generated carrier and bit timing signals generated by carrier timing generator 158 and corrects the carrier phase and the bit timing so that the data transmitted from transmitting device 144 on DATA IN communications network 310 will be in phase with the data received by monitor device 240.

The corrected bit timing signals are transmitted from phase correction circuit 156 to data encoding and interface control device 164 where data from the remote terminal are encoded for transmission. The interface control portion of data encoding and interface control device 164 presents an inhibit signal on line 165 to phase correction circuit 156 to inhibit the transmission of corrected bit timing and carrier signals whenever a more remote terminal having a higher priority is transmitting data.

Encoded data is transmitted from data encoder and interface control device 164 through filter C 168 to modulator 162 where the encoded data is mixed with the corrected carrier signal and retransmitted to filter D and summing circuit 166 which after summing the modulated signal with the corrected carrier signal transmits the composite signal to line driver 172 which then transmits the signal to the central control location on DATA IN communications network 310.

The phase corrections which are made in phase correction circuit 156 are such that the timing of the monitor device 240 is not in phase with the timing in transmitting device 144 but rather the corrections are made such that the carrier and bit timing signals in monitor device 240 are in phase lock with the carrier and bit timing signals in the transmitting device 144.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A synchronization system not requiring resynchronization comprising:

a transmission line;

a central control device connected to said transmission line and receiving modulated carrier signals therefrom;

a first remote terminal for generating first data to be transmitted to said central control device;

a first data transmission means having an input connected to said first remote terminal and having an output connected to said transmission line for transmitting said first data as a first data modulated carrier on said transmission line;

a second remote terminal for generating second data to be transmitted to said central control device after said first data has been transmitted;

a second data transmission means having an input connected to the output of said second remote terminal and having an output connected to said transmission line for transmitting said second data as a second data modulated carrier;

a synchronizing means having an input connected to said transmission line, and having an output connected to said second data transmission means, said synchronizing means being responsive to said first data modulated carrier for generating synchronization signals to synchronize said second data modulated carrier with said previously transmitted first data modulated carrier.

2. A synchronization system according to claim 1 wherein said synchronizing means comprises:

carrier phase detecting means connected to said transmission line for detecting carrier phase of said first data modulated carrier; and bit timing recovery means connected to said transmission line through a demodulation means for recovering bit timing of said first data modulated carrier, the outputs of said detection means and recovery means being connected to inputs of said second data transmission means to synchronize said second data modulated carrier to have the carrier phase and bit timing of said first data modulated carrier.

3. A synchronization system according to claim 2 further comprising:

a plurality of less remote terminals for generating additional data;

a plurality of data transmission means, each of said data transmission means having an input connected to an output of an individual accompanying one of said plurality of less remote terminals, the output of each of said transmission means being connected to said transmission line;

a plurality of synchronizing means, each of said synchronizing means having an input connected to said transmission line and having an output connected to an individual accompanying one of said data transmission means for synchronizing an additional data modulated carrier to be transmitted by each of said individual accompanying data transmission means to have the carrier phase and bit timing of modulated carrier signals previously transmitted on said transmission line.

4. A data communication system not requiring resynchronization, comprising:

a data communications network having a DATA OUT line and a DATA IN line;

a central control device having an output connected to said DATA OUT line and having an input connected to said DATA IN line;

a first data reception means having an input connected to said DATA OUT line;

a first remote terminal having an input connected to an output of said first data reception means, said first remote terminal generating data;

a first data transmission means having an output connected to said DATA IN line and having an input connected to an output of said first remote terminal for transmitting data generated by said first remote terminal, as a data modulated carrier signal;

a plurality of less remote terminals, each of said less remote terminals having an input connected to an individual accompanying synchronizing means, each of said less remote terminals having an output connected to an individual accompanying data transmission means, an output of each individual accompanying data transmission means being connected to said DATA IN line;

each of said individual accompanying synchronizing means further comprising detection means having an input connected to said DATA IN line for detecting carrier phase and bit timing of data modulated carrier signals being transmitted on said DATA IN channel, an output of said detection means being connected to said individual accompanying data transmission means to synchronize additional data modulated carrier signals to be transmitted by said individual accompanying data transmission means to have the carrier phase and bit timing of said data modulated carrier signals being transmitted on said DATA IN line.

5. A data communications system according to claim 4 wherein said output of said detection means of each of said accompanying synchronizing means is connected to said individual accompanying data transmission means through a delay means for delaying carrier phase and bit timing detected by said detection means by an amount of time such that the carrier phase and bit timing of additional data modulated carrier signals transmitted by said individual accompanying data transmission means will be in phase with data modulated carrier signals on said DATA IN channel and delayed therefrom by an integral number of cycles.

6. A data communications system according to claim 5 wherein each of said individual accompanying data transmission means comprises:

local timing and carrier generation means for locally generating bit timing and carrier signals;

and compare and correction means for comparing the locally generated carrier and bit timing with carrier phase and bit timing reference signals received from said individual accompanying synchronizing means for maintaining synchronization of additional data modulated carrier signals to be transmitted with data modulated carrier signals previously transmitted on said DATA IN channel.

* * * * *